US009511882B2

(12) United States Patent
McMickell et al.

(10) Patent No.: US 9,511,882 B2
(45) Date of Patent: Dec. 6, 2016

(54) CONFIGURABLE SPACE STATION MOMENTUM

(71) Applicant: Honeywell International Inc., Morristown, NJ (US)

(72) Inventors: Brett McMickell, Scottsdale, AZ (US); Mitch Fletcher, Glendale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 433 days.

(21) Appl. No.: 14/280,132

(22) Filed: May 16, 2014

(65) Prior Publication Data

US 2015/0329222 A1    Nov. 19, 2015

(51) Int. Cl.
| | | |
|---|---|---|
| *B64G 1/10* | (2006.01) | |
| *B64G 1/36* | (2006.01) | |
| *B64G 1/24* | (2006.01) | |
| *B64G 1/64* | (2006.01) | |
| *B64G 1/28* | (2006.01) | |

(Continued)

(52) U.S. Cl.
CPC ............... *B64G 1/36* (2013.01); *B64G 1/242* (2013.01); *B64G 1/28* (2013.01); *B64G 1/283* (2013.01); *B64G 1/288* (2013.01); *B64G 1/646* (2013.01); *G05D 1/00* (2013.01); *B64G 1/002* (2013.01); *B64G 1/361* (2013.01); *B64G 1/363* (2013.01); *B64G 2001/1092* (2013.01)

(58) Field of Classification Search
CPC .......... B64G 1/242; B64G 1/10; B64G 1/28; B64G 1/646; B64G 1/283; B64G 1/288; B64G 1/363; B64G 1/361; B64G 2001/1092; B64G 1/36; B64G 1/002; G05D 1/00
USPC ................... 244/158.4, 158.5, 161
See application file for complete search history.

(56) References Cited

U.S. PATENT DOCUMENTS

| | | | | |
|---|---|---|---|---|
| 4,071,211 A | * | 1/1978 | Muhlfelder | ............ B64G 1/283 244/165 |
| 6,523,785 B1 | * | 2/2003 | Hennigan | ............ G05D 1/0883 244/164 |
| 7,014,150 B2 | | 3/2006 | Peck et al. | |

(Continued)

OTHER PUBLICATIONS

Andreas C. Nearchou, "Adaptive navigation of autonomous vehicles using evolutonary algorithm", Artificial Intelligence in Engineering 13(1999) 159-173, pp. 159-160.*

(Continued)

*Primary Examiner* — Brian M O'Hara
*Assistant Examiner* — Assres H Woldemaryam
(74) *Attorney, Agent, or Firm* — Fogg & Powers LLC

(57) ABSTRACT

A method of deploying a modular space station comprises placing an initial space station module in space in a first deployment, the initial space station module including a first control law and momentum component that provides an initial solution for guidance, navigation, and control (GNC) during the first deployment. A first space station modular segment is joined with the initial space station module in a second deployment to produce a first joint configuration of the space station. A second control law and momentum component provides a second solution for GNC of the first joint configuration during the second deployment. A second space station modular segment is joined to the first joint configuration in a third deployment to produce a second joint configuration of the space station. A third control law and momentum component provides a third solution for GNC of the second joint configuration during the third deployment.

11 Claims, 8 Drawing Sheets

(51) Int. Cl.
  *G05D 1/00* (2006.01)
  *B64G 1/00* (2006.01)

(56) References Cited

U.S. PATENT DOCUMENTS

| | | |
|---|---|---|
| 7,152,495 B2 | 12/2006 | Peck |
| 7,421,526 B2 | 9/2008 | Fletcher et al. |
| 7,512,466 B2 * | 3/2009 | Hart ............... B64G 1/283 180/7.1 |
| 8,175,759 B2 | 5/2012 | Fletcher |
| 8,209,070 B2 * | 6/2012 | Hamilton ......... G05D 1/0883 244/158.4 |
| 8,312,782 B2 | 11/2012 | McMickell et al. |
| 8,588,970 B2 | 11/2013 | Fletcher et al. |
| 8,880,246 B1 * | 11/2014 | Karpenko .......... B64G 1/24 244/158.1 |
| 2003/0164428 A1 * | 9/2003 | Anderman ......... B64G 1/007 244/172.4 |
| 2005/0151022 A1 * | 7/2005 | D'Ausilio ......... B64G 1/007 244/171.1 |
| 2007/0029446 A1 * | 2/2007 | Mosher ............. B64G 1/10 244/158.1 |
| 2008/0035797 A1 * | 2/2008 | Defendini ......... B64G 1/286 244/165 |
| 2009/0302166 A1 * | 12/2009 | Meyers ............. B64G 1/002 244/158.9 |
| 2010/0038491 A1 * | 2/2010 | Cepollina .......... B64G 1/1078 244/172.5 |
| 2010/0193641 A1 * | 8/2010 | Liu ................. G05D 1/0883 244/165 |
| 2011/0011982 A1 * | 1/2011 | Herman ............ B64G 1/286 244/165 |

OTHER PUBLICATIONS

Chubb etal., "Skylab Attitude and Pointing Control System", pp. 1-8, Feb. 1971.*
NASA, "International Space Station Basics".*
"Internet Archives WayBack Machine", Jan. 20, 2010.*

* cited by examiner

CONFIGURABLE SPACE STATION MOMENTUM

BACKGROUND

One element of spacecraft design is attitude stabilization. Any uncontrolled body in space will tumble about all axes in responses to natural forces. A manned spacecraft not only has the effects of the natural forces, but additionally has to deal with the disturbance added by the human occupants. Tumbling is not normally acceptable because solar panels, communication antennas, and other instruments need to have a stable platform. Additionally, humans in a vehicle have adverse affects to the motion of an un-stabilized vehicle.

There are several methods to provide spacecraft stabilization; however, long duration missions or missions requiring precision pointing typically use an attitude control system in addition to thrusters. Attitude control includes three tasks: measuring attitude, correction of attitude, and a control law, which is the mechanism that determines the magnitude and direction of correction (e.g., see U.S. Pat. No. 7,014,150; U.S. Pat. No. 8,209,070). A typical control system uses momentum control devices such as reaction wheels or Control Moment Gyroscopes (CMGs) as attitude control, and an attitude control computer to execute the control law. Large satellites and space stations have momentum demands that usually require a CMG as the momentum device.

A CMG is generally used in spacecraft attitude control systems for 3-axis vehicle stabilization. A CMG generally includes a spinning rotor and one or more motorized gimbals that tilt the rotor's angular momentum. As the rotor tilts, the changing angular momentum causes a gyroscopic torque that through the principle of conservation of momentum results in the rotation of the spacecraft. Additionally, the change in angular momentum can absorb disturbance motion, thus stabilizing the spacecraft.

Contemporary space stations, including the Spacelab, Salyut, and International Space Station, have used a CMG for vehicle stabilization. An issue with using a CMG for larger space stations is that the momentum size for the space station must be known to set the momentum size required to stabilize and control the space station.

During the assembly of the International Space Station (ISS), a full size CMG array was sent into space with the first module of the ISS. The CMG array had an initial configuration, which far underused the initial momentum, but was "right sized" for the final ISS momentum. For any large space station constructed beyond Low Earth Orbit (LEO), the physical size of the CMG array required is so large that it cannot be transported in the space vehicles now in use. As such, current sizing methods require a "final" design of the next space station and do not allow the flexibility that is required for future NASA missions.

SUMMARY

A method of deploying a modular space station is provided. The method comprises placing an initial space station module in space in a first deployment, the initial space station module including a first control law and momentum component that provides an initial solution for guidance, navigation, and control of the initial space station module during the first deployment. A first space station modular segment is joined with the initial space station module in a second deployment to produce a first joint configuration of the modular space station. A second control law and momentum component provides a second solution for guidance, navigation, and control of the first joint configuration of the modular space station during the second deployment. A second space station modular segment is joined to the first joint configuration of the modular space station in a third deployment to produce a second joint configuration of the modular space station. A third control law and momentum component provides a third solution for guidance, navigation, and control of the second joint configuration of the modular space station during the third deployment.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A method and system for configuring space station momentum size requirements provides enhanced attitude control and flexibility when modular space station structures are joined together in space.

In one embodiment, a spacecraft with an onboard space station modular segment can be employed to transport a control moment gyroscope (CMG) array, or other momentum control device, that has been sized with the appropriate momentum space associated with the modular segment. The control law located in a vehicle flight computer can contain a table that defines the control parameters and mass properties of the space station segment to be controlled including, but not limited to, the moments of inertia and center of mass of the vehicle. Additionally, the table can contain the momentum and torque vector information describing the CMG array contained within the modular segment.

In order to meet mission safety protocols, partitioned software applications for guidance, navigation and control (GNC) are provided by the control law located in the vehicle flight computer. The GNC applications are implemented using time and space partitioning, which allows dynamic but predetermined switchover from a current GNC configuration to a next GNC configuration.

When the modular segment is joined to the space station, a central computer can be used to combine control of the CMG array of the modular segment with the control of other CMG arrays already contained in the space station. The central computer provides vehicle control law that includes the CMG array steering law and control instructions that cause the CMG arrays of the joined modular segments to produce a desired space station vehicle attitude control.

The present approach solves the problem of large CMGs and oversized momentum for modular space stations assembled in space.

Further details of the present method and system are described hereafter with reference to the drawings.

Figure 1:
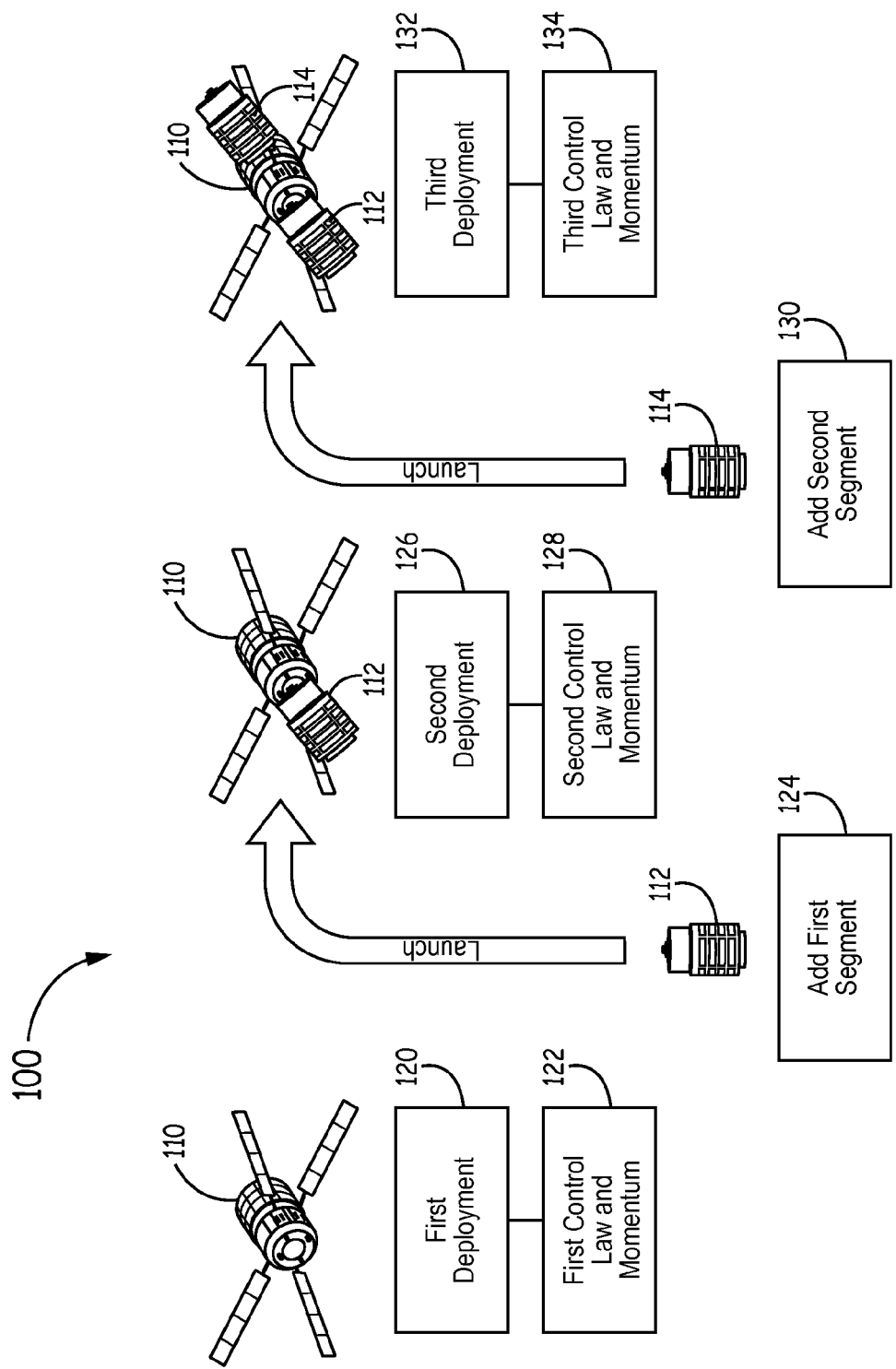
FIG. 1 is a block diagram depicting an exemplary method of deploying a modular space station in space.

FIG. 1 illustrates an exemplary method 100 of deploying a modular space station in space. An initial space station module 110 is placed in space in a first deployment (block 120), such as by a rocket launch. The initial space station module 110 includes a first control law and momentum component (block 122), which provides an initial solution for guidance, navigation, and control of initial space station module 110 during the first deployment.

A first space station modular segment 112 is added (block 124) by launching modular segment 112 into space. The modular segment 112 is then joined with space station module 110 in a second deployment (block 126), which produces a first joint configuration of the modular space station. A second control law and momentum component (block 128) provides a second solution for guidance, navigation, and control of the first joint configuration of the modular space station during the second deployment.

A second space station modular segment 114 can be added (block 130) by launching modular segment 114 into space. The modular segment 114 is then joined with space station module 110 already coupled with modular segment 112 in a third deployment (block 132), which produces a second joint configuration of the modular space station. A third control law and momentum component (block 134) provides a third solution for guidance, navigation, and control of the second joint configuration of the modular space station during the third deployment.

Although only two modular segments are depicted in the method of FIG. 1, it should be understood that additional modular segments can be added to the modular space station as needed using the procedures described herein.

Figure 2:
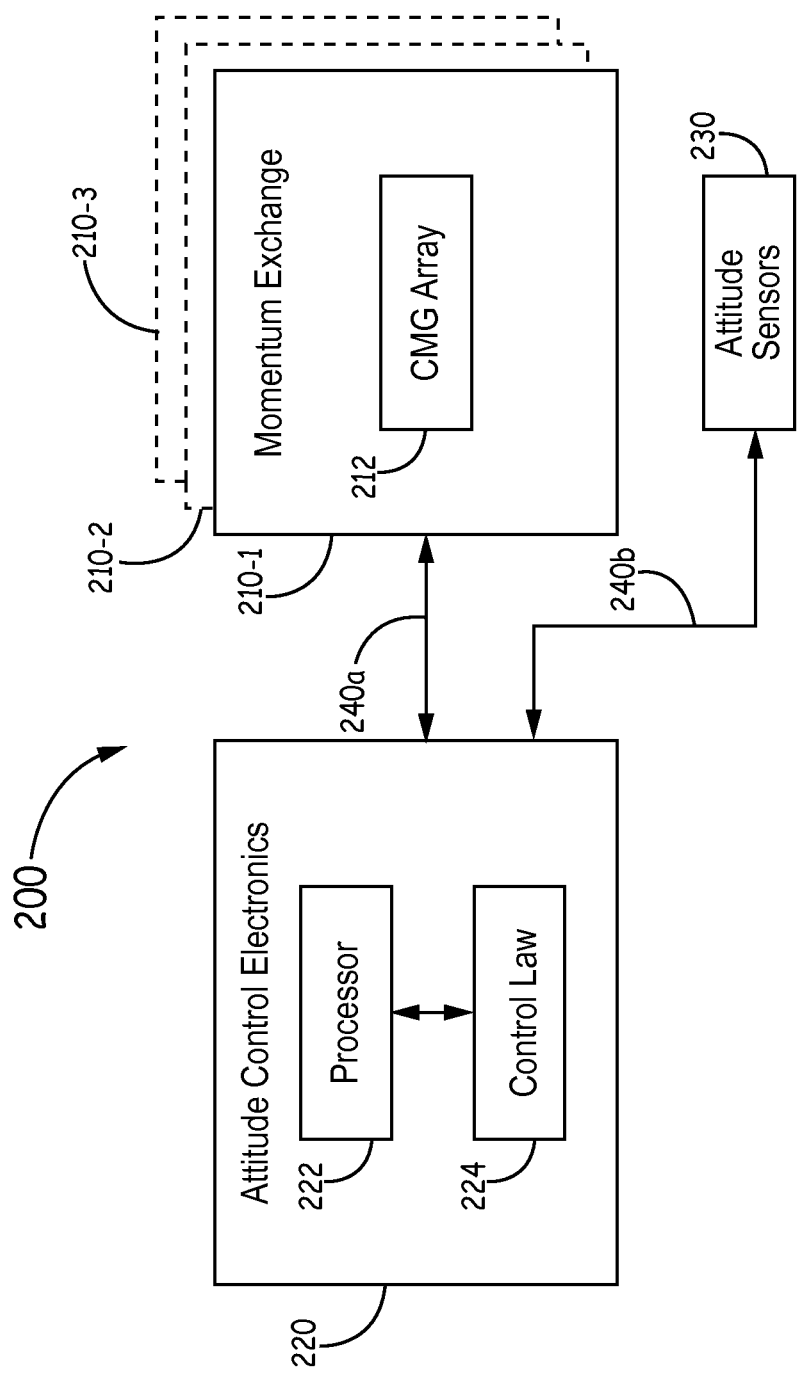
FIG. 2 is a block diagram of an attitude control system according to one embodiment, which can be employed in the modular space station of FIG. 1.

FIG. 2 illustrates an exemplary embodiment of an attitude control system 200, which can be employed in the modular space station of FIG. 1. The attitude control system 200 includes a first momentum exchange section 210-1 that operatively communicates with an attitude control electronics section 220 of a flight computer. A set of attitude sensors 230 also operatively communicates with attitude control electronics section 220. A first virtual backplane line 240a provides for information exchange between attitude control electronics section 220 and momentum exchange section 210-1. A second virtual backplane line 240b provides for information exchange between attitude control electronics section 220 and attitude sensors 230.

The momentum exchange section 210-1 houses an array of momentum control devices such as a CMG array 212, which embodies the required momentum storage for a given deployment. For example, momentum exchange system 210-1 can include the momentum storage required for the first deployment of initial space station module 110. In one embodiment, a plurality of control momentum assemblies that each includes a CMG can be located in momentum exchange section 210-1 to produce CMG array 212. In an alternative embodiment, the momentum control devices can include a plurality of reaction wheels.

The attitude control electronics section 220 includes at least one flight computer processor 222 and an attitude control law 224, with processor 222 hosting the operation of control law 224. A software attitude control component, described in further detail hereafter, is the software that implements control law 224. The software for control law 224 provides instructions executable by processor 222 for guidance, navigation, and control.

The attitude sensors 230 also operatively communicate with control law 224 as executed by processor 222. The attitude sensors 230 can include, but are not limited, to Inertial Measurement Units (IMUs), accelerometers, star trackers, and sun sensors. The attitude sensors 230 provide inertial data and other information used by attitude control electronics section 220 in controlling CMG array 212.

Additional CMG arrays with appropriate momentum storage can be transported into space with additional modular segments that are to be joined with the space station. For example, a second momentum exchange section 210-2 with a CMG array can be transported with modular segment 112 and connected to attitude control electronics section 220 in the second deployment of the space station. Likewise, a third momentum exchange section 210-3 with a CMG array can be transported with modular segment 114 and connected to attitude control electronics section 220 in the third deployment of the space station.

Figure 3A:
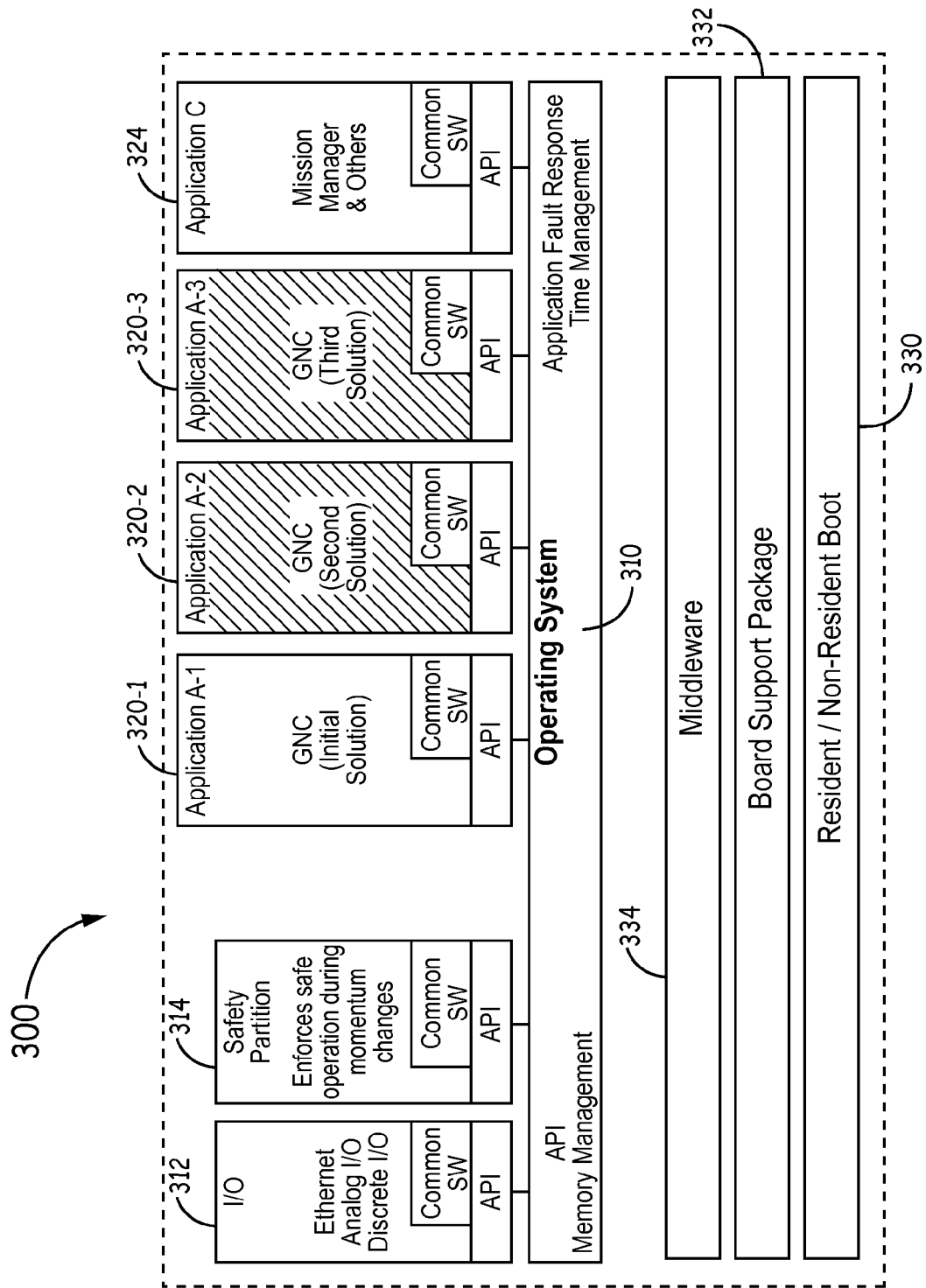
FIGS. 3A-3C are block diagrams illustrating a vehicle operation software architecture according to one embodiment, which can be employed in the attitude control system of FIG. 2.
Figure 3B:
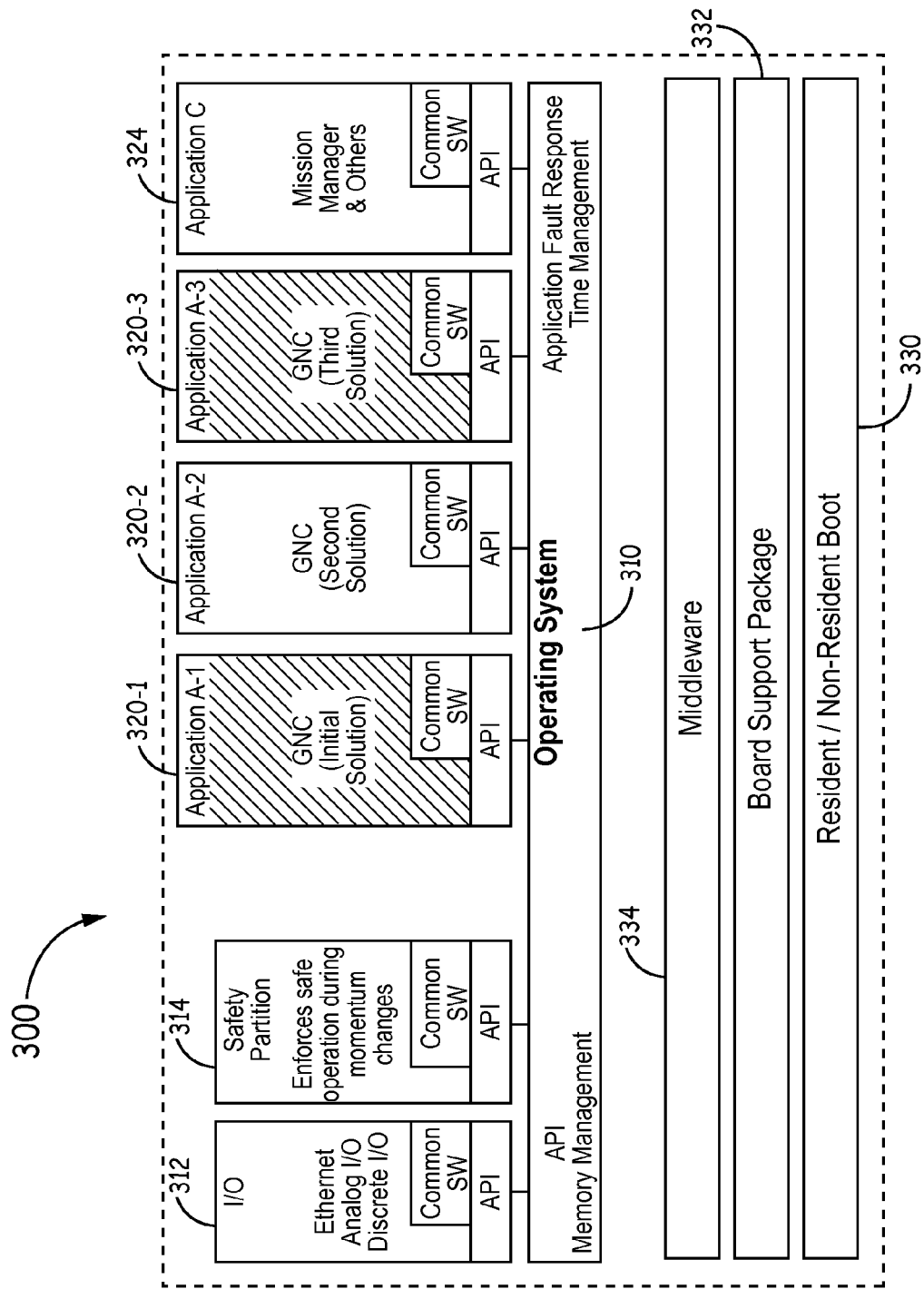
Figure 3C:
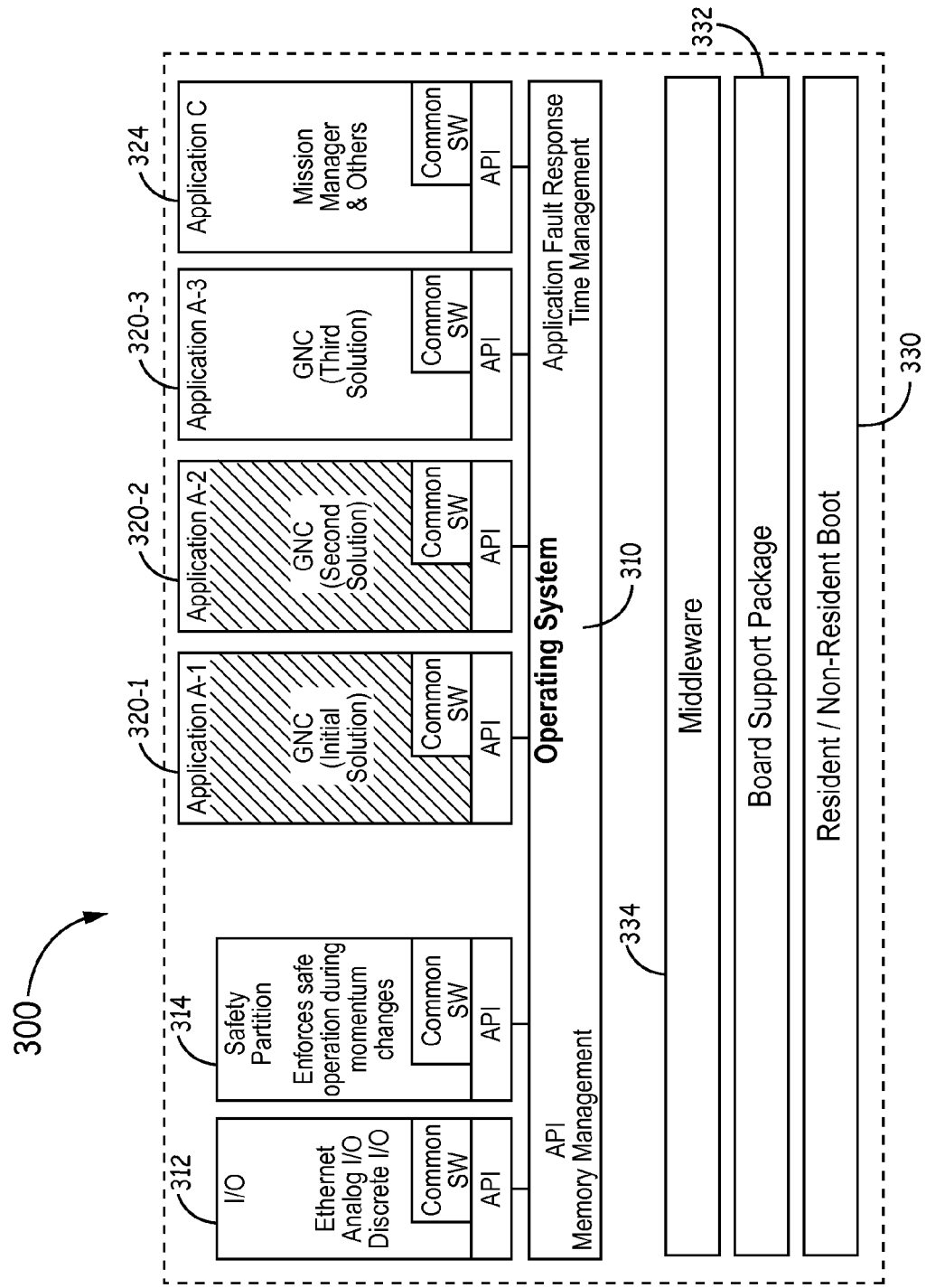

FIGS. 3A-3C illustrate a vehicle operation software architecture 300 according to one embodiment, which is used to implement the entire vehicle operation, including the attitude control system 200 (FIG. 2) for the modular space station. A flight computer that implements software architecture 300 includes a partitioned operating system 310, which can include an Application Programming Interface (API), memory management functions, application fault response protocols, and time management features. In one embodiment, operating system 310 can adhere to the protocol defined in ARINC-653 (Avionics Application Standard Software Interface). ARINC-653 defines a standard Real Time Operating System (RTOS) interface for partitioning of avionics computer resources in the time and space domains. This standard also specifies APIs for abstraction of the applications from the underlying avionics hardware and software.

The software architecture 300 also includes various software partitions. In one embodiment, an input/output (I/O) partition 312 is in operative communication with operating system 310. The I/O partition 312 includes virtual backplane communications, which provide the information exchange between the flight computer and control law, and the attitude sensors and the momentum exchange. The I/O partition 312 can also include an Ethernet interface, analog I/O, discrete I/O, a MIL-STD 1553 interface, an RS-422 interface, as well as other common software (SW) components. MIL-STD-1553 is a military standard published by the United States Department of Defense that defines the mechanical, electrical, and functional characteristics of a serial data bus. RS-422 is a technical standard that specifies electrical characteristics of a digital signaling circuit. The I/O partition 312 also includes an API such as an ARINC-653 API that allows I/O partition 312 to interact with operating system 310. The I/O partition 312 may house all of the I/O drivers and assures that the I/O data is moved to and from various partitions and applications according to pre-defined table entries.

A safety partition 314 is also in operative communication with operating system 310. The safety partition 314 provides safety rules that enforce safe operations during momentum changes as a new modular segment is joined to the space station. The safety partition 314 also includes an API such as an ARINC-653 API that allows safety partition 314 to interact with operating system 310, as well as other common software components.

The software architecture 300 further includes a plurality of applications that are in operative communication with operating system 310.

A first application 320-1 (labeled Application A-1) provides an initial solution for control law 224 in attitude control system 200, inclusive of guidance, navigation, and control (GNC) for a first deployment of the modular space station. The first application 320-1 also includes use of common software library elements, and an API such as an ARINC-653 API that allows application 320-1 to interact with operating system 310.

A second application 320-2 (labeled Application A-2) provides a second solution for control law 224 in attitude control system 200, inclusive of GNC for a second deployment of the modular space station, such as a first modular segment added to the initially deployed space station. The second application 320-2 also includes other common software library elements, and an API such as an ARINC-653 API that allows application 320-2 to interact with operating system 310.

A third application 320-3 (labeled Application A-3) provides a third solution for control law 224 in attitude control system 200, inclusive of GNC for a third deployment of the modular space station, such as a second modular segment added to the space station already coupled with the first modular segment. The third application 320-3 also includes other common software library elements, and an API such as an ARINC-653 API that allows application 320-3 to interact with operating system 310.

A fourth application 324 (labeled Application C) provides mission manager and other functions during the various deployments of the space station. The fourth application 324 also includes other common software library elements, and an API such as an ARINC-653 API that allows application 324 to interact with operating system 310. There may be one or more additional applications as necessary to implement the required space station vehicle operation.

The vehicle operation software architecture 300 can also include various other standard software elements as necessary to allow operation of the flight computer processor 222. For example, resident and non-resident boot elements 330 can be implemented and are in operative communication with operating system 310. The resident boot element can include resident boot initialization, and a first hardware abstraction layer (HAL-1). The non-resident boot element can include non-resident boot initialization, and a second hardware abstraction layer (HAL-2), as well as a power-up boot, a phantom fault response, a software loader, platform load verification, module load verification, and cabinet initialization.

A board support package (BSP) 332 can be implemented and is in operative communication with operating system 310. The BSP 332 provides the software elements that are a custom match to the specific hardware that implements the flight computer processor 222. A middleware module 334 can also be implemented and is in operative communication with operating system 310. The middleware module 334 provides the functions that interface between operating system 310 and BSP 332. These middleware functions can include, but are not limited to, exception handling, fault recording, synchronization, interface to debug tools, and time services.

FIG. 3A depicts software architecture 300 in a first configuration, which provides the initial solution for GNC of a modular space station in a first deployment, such as initial space station module 110 (FIG. 1). In this first configuration, first application 320-1 (Application A-1), containing the initial solution for control law 224 in attitude control system 200), is activated, whereas the second and third applications 320-2, 320-3 are inactive.

FIG. 3B depicts software architecture 300 in a second configuration that provides the second solution for GNC of the modular space station. This second configuration can be used for a second deployment of the space station, such as when modular segment 112 is joined with space station module 110 (FIG. 1). In the second configuration, second application 320-2 (Application A-2), containing the second solution for control law 224, is activated, whereas the first and third applications 320-1, 320-3 are inactive.

FIG. 3C depicts software architecture 300 in a third configuration that provides the third solution for GNC of the modular space station. This third configuration can be used for a third deployment of the space station, such as when modular segment 114 is joined with space station module 110 already coupled with modular segment 112 (FIG. 1). In the third configuration, third application 320-3 (Application A-3), containing the third solution for control law 224, is activated, whereas the first and second applications 320-1, 320-2 are inactive.

In one approach, each of the first, second, and third configurations of software architecture 300 can be respectively transported into space with the initial space station module, and with the additional modular segments that are to be joined with the space station. For example the first configuration (FIG. 3A) can be transported with the initial space station module 110, the second configuration (FIG. 3B) can be transported with modular segment 112, and the third configuration (FIG. 3C) can be transported with modular segment 114.

Alternatively, each of the first, second, and third configurations of software architecture 300 can be transported into space with the initial space station module. Each of the configurations of software architecture 300 can then be implemented during the respective deployments of the space station as additional modular segments are added.

Figure 4:
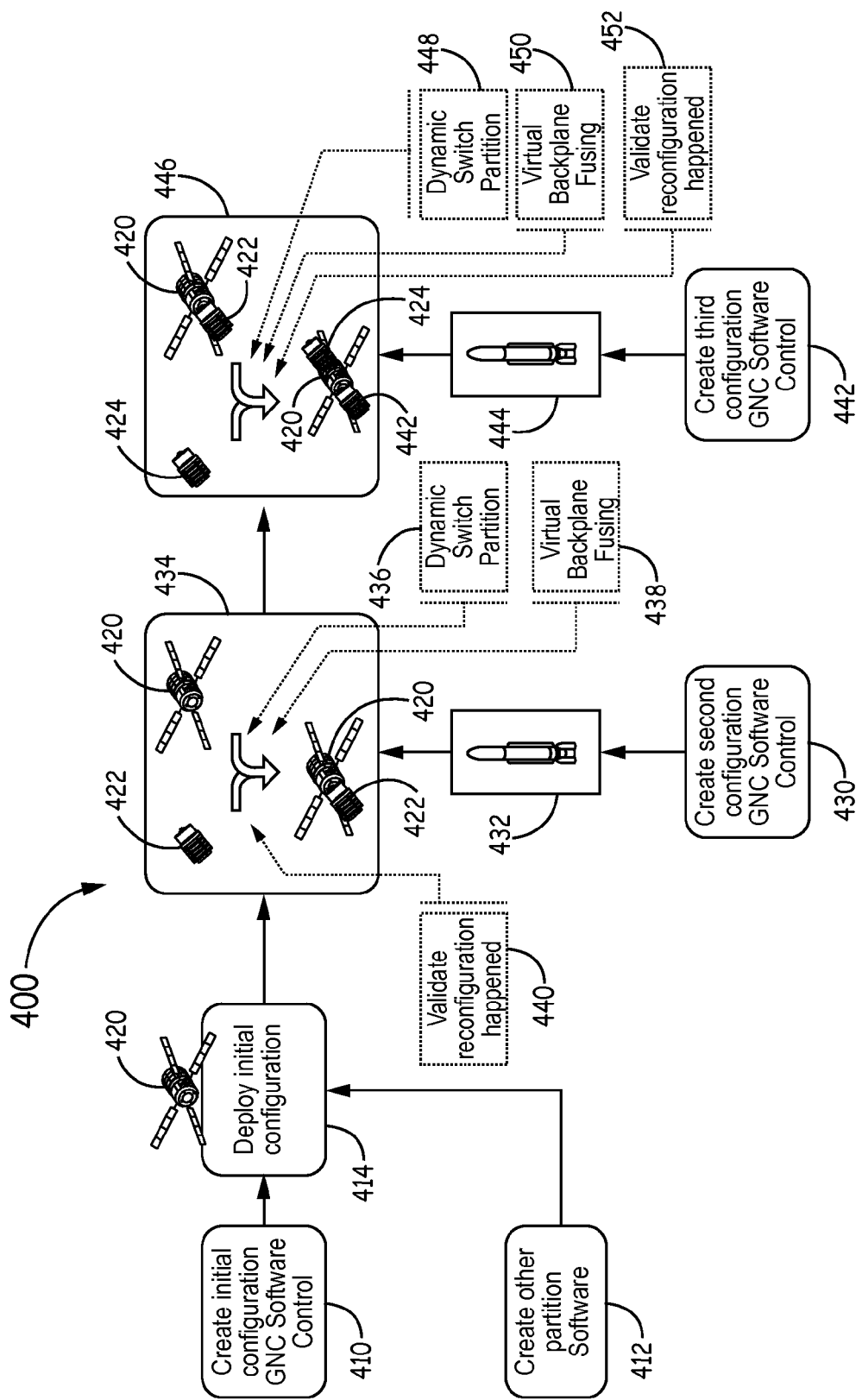
FIG. 4 is a block diagram depicting an exemplary process for deploying a modular space station in multiple stages using the vehicle operation software architecture of FIGS. 3A-3C.

FIG. 4 illustrates an exemplary process 400 for deploying a modular space station in multiple stages using the vehicle operation software architecture 300 shown in FIGS. 3A-3C. In process 400, an initial (first) configuration of a GNC software control is created (block 410), such as the first configuration of software architecture 300 (FIG. 3A), in which first application 320-1 contains the initial solution for control law 224. This provides the attitude control element for vehicle operation during an initial deployment of the space station. Other partition software is also created (block 412), which provides mission manager and other control functions during the various deployments of the space station. The initial configuration of the GNC software control, as well as the other partition software, are implemented in an attitude control system for an initial stage of the space station, such as a space station module 420, which is then deployed in space (block 414).

For the next stage of process 400, a second configuration of the GNC software control is created (block 430), such as the second configuration of software architecture 300 (FIG. 3B), in which second application 320-2 contains the second solution for control law 224. This provides the attitude control element for vehicle operation during a second deployment of the space station. The second configuration of the GNC software control is incorporated in a first modular segment 422, which is launched in a spacecraft such as a rocket (block 432) into space. The modular segment 422 is joined with space station module 420, resulting in the second deployment of the space station (block 434).

In the second deployment, the GNC software control is reconfigured from the first configuration (FIG. 3A) to the second configuration (FIG. 3B) by conventional techniques, such as a dynamic switch partition (block 436) and virtual backplane fusing (block 438). These techniques are disclosed in U.S. Pat. No. 7,421,526, the disclosure of which is incorporated herein by reference. The process 400 then validates that the reconfiguration happened (block 440), such as through the validation technique disclosed in U.S. Pat. No. 8,175,759, the disclosure of which is incorporated herein by reference.

In the next stage of process 400, a third configuration of the GNC software control is created (block 442), such as the third configuration of software architecture 300 (FIG. 3C), in which third application 320-3 contains the third solution for control law 224. This provides the attitude control element for vehicle operation during a third deployment of the space station. The third configuration of the GNC software control is incorporated in a second modular segment 424, which is launched in a spacecraft such as a rocket (block 444) into space. The modular segment 424 is joined with space station module 420 already coupled with modular segment 422, resulting in the third deployment of the space station (block 446).

In the third deployment, the GNC software control is reconfigured from the second configuration (FIG. 3B) to the third configuration (FIG. 3C) by conventional techniques, such as the dynamic switch partition (block 448) and virtual backplane fusing (block 450) as disclosed in U.S. Pat. No. 7,421,526. The process 400 then validates that this reconfiguration happened (block 452), such as through the validation technique disclosed in U.S. Pat. No. 8,175,759.

It should be understood that additional modular segments can be added to the space station in further deployments using the process of FIG. 4.

Figure 5:
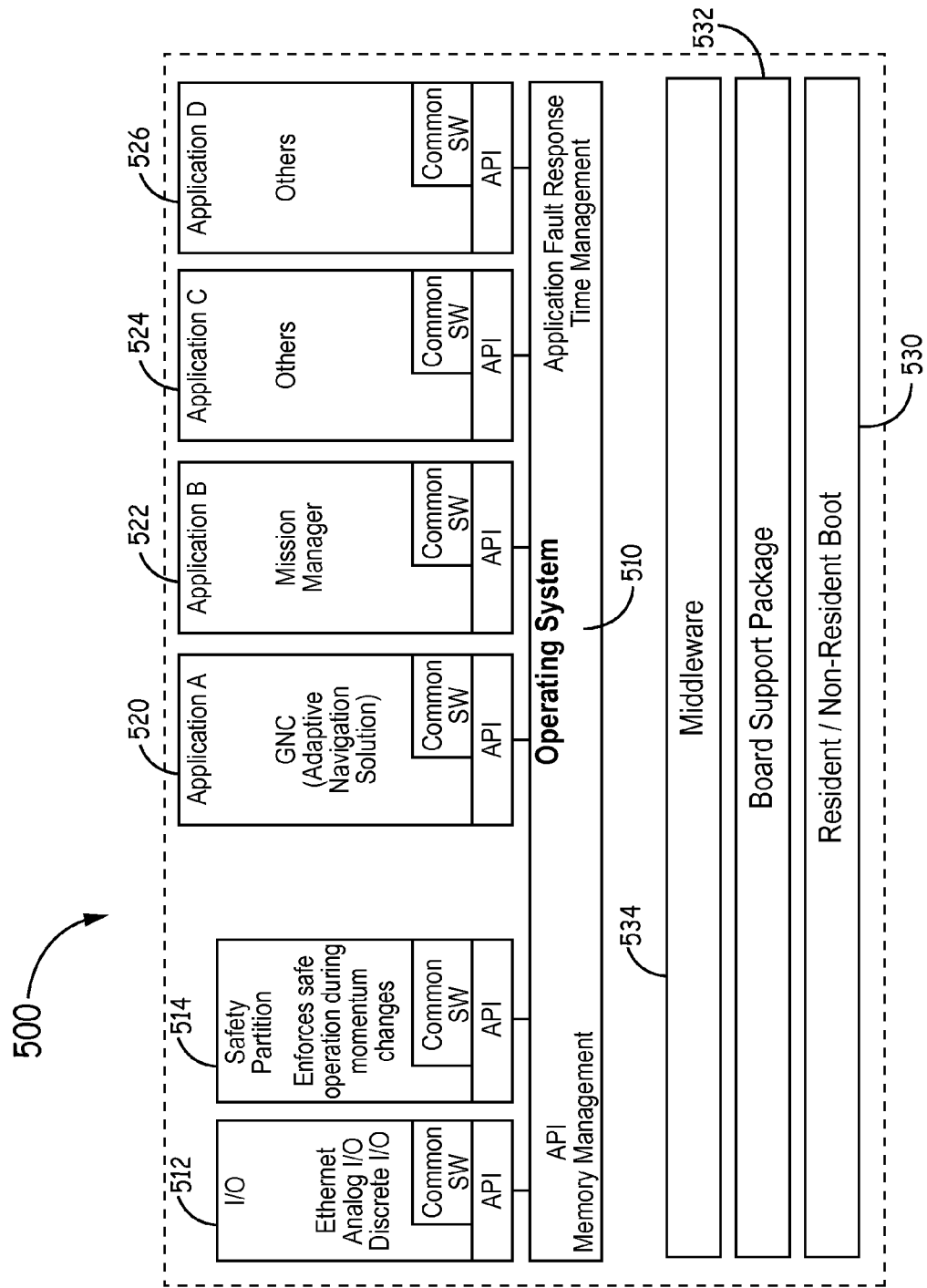
FIG. 5 is a block diagram illustrating a vehicle operation software architecture according to another embodiment, which can be employed in the attitude control system of FIG. 2.

FIG. 5 illustrates a vehicle operation software architecture 500 according to another embodiment, which is used to implement the entire vehicle operation, including the attitude control system 200 (FIG. 2) for a modular space station. A flight computer that implements software architecture 500 includes a partitioned operating system 510, which can include an API, memory management functions, application fault response protocols, and time management features. In one embodiment, operating system 510 can adhere to the protocol defined in ARINC-653.

The software architecture 500 also includes various software partitions. In one embodiment, an I/O partition 512 is in operative communication with operating system 510. The I/O partition 512 includes virtual backplane communications, which provide the information exchange between the flight computer and control law, and the attitude sensors and the momentum exchange. The I/O partition 512 can also include an Ethernet interface, analog I/O, discrete I/O, a MIL-STD 1553 interface, an RS-422 interface, as well as other common software components. The Ute partition 512 also includes an API such as an ARINC-653 API that allows I/O partition 512 to interact with operating system 510.

A safety partition 514 is also in operative communication with operating system 510. The safety partition 514 provides functions that enforce safe operations during momentum changes, as well as other common software components. The safety partition 514 also includes an API such as an ARINC-653 API that allows safety partition 514 to interact with operating system 510.

The software architecture 500 further includes a plurality of applications that are in operative communication with operating system 510.

A first application 520 (labeled Application A), is configured to provide guidance, navigation, and control, and includes an adaptive navigation solution algorithm. The first application 520 also includes use of common software library elements, and an API such as an ARINC-653 API that allows application 522 to interact with operating system 510.

A second application 522 (labeled Application B) is configured to provide mission manager functions during the various deployments of the space station. The second application 522 also includes other common software library elements, and an API such as an ARINC-653 API that allows application 522 to interact with operating system 510.

A third application 524 (labeled Application C) and fourth application 526 (labeled Application D) are configured to provide other functions as needed in the various deployments of the space station. The third and fourth applications 524, 526 also include other common software library elements, and APIs such as ARINC-653 APIs that allow for interaction with operating system 510. There may be one or more additional applications as necessary to implement the required space station vehicle operation.

The vehicle operation software architecture 500 can also include various other standard software elements as necessary to allow operation of a flight computer processor. For example, resident and non-resident boot elements 530 can be implemented and are in operative communication with operating system 510. A board support package 532 can be implemented and is in operative communication with operating system 510. A middleware module 534 can also be implemented and is in operative communication with operating system 510.

Figure 6:
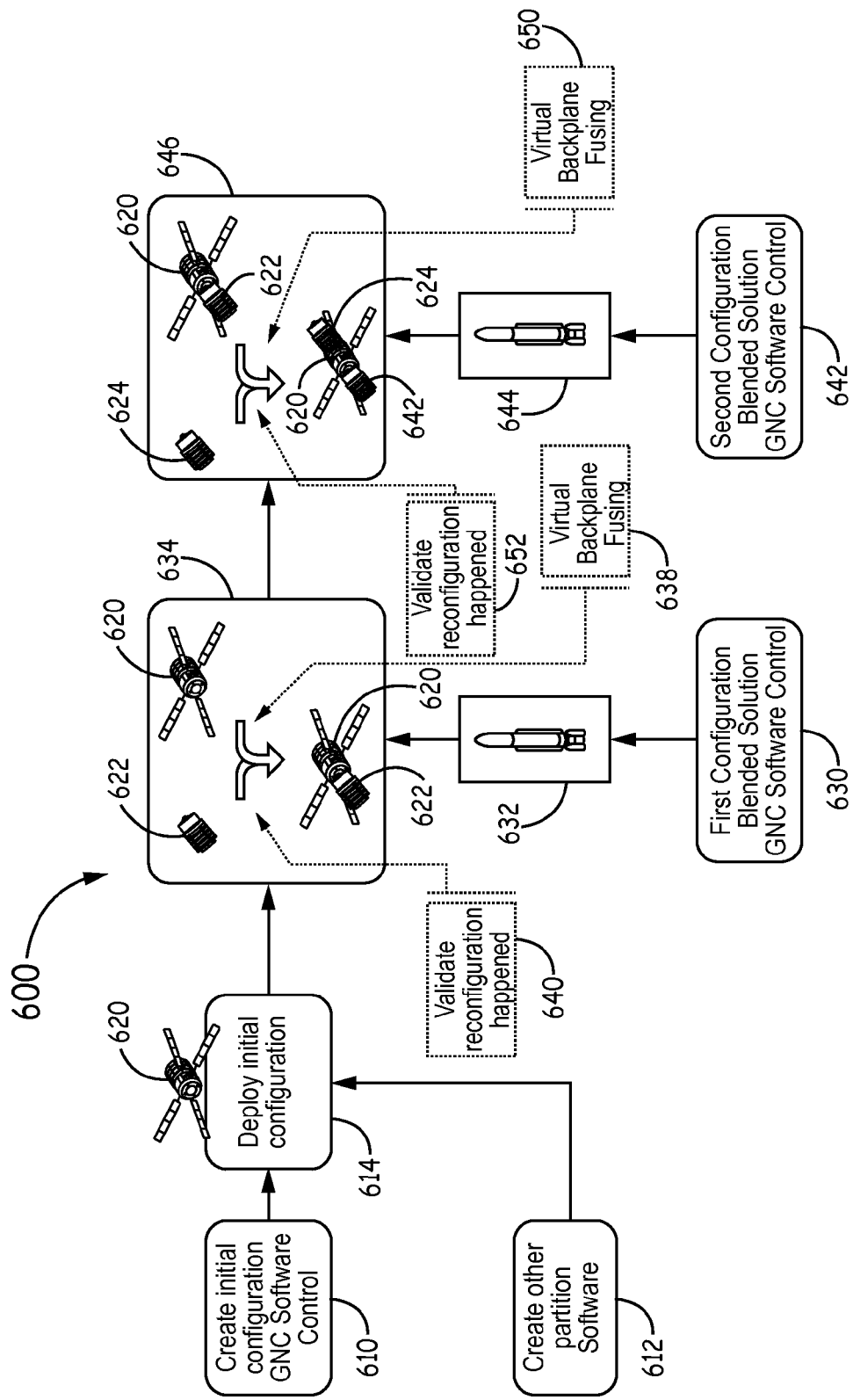
FIG. 6 is a block diagram depicting an exemplary process for deploying a modular space station in multiple stages using the vehicle operation software architecture of FIG. 5.

FIG. 6 illustrates an exemplary process 600 for deploying a modular space station in multiple stages using the vehicle operation software architecture 500 shown in FIG. 5. In process 600, an initial configuration of a GNC software control is created (block 610), such as first application 520 that contains an initial adaptive navigation solution for control law 224 (FIG. 2). This provides the attitude control element for vehicle operation during an initial deployment of the space station. Other partition software is also created (block 612), which provides mission manager and other control functions during the various deployments of the space station. The initial configuration of the GNC software control, as well as the other partition software, are implemented in attitude control system 220 for an initial stage of the space station, such as a space station module 620, which is then deployed in space (block 614).

For the next stage of process 600, a first configuration of a blended solution for GNC software control is produced (block 630), such as by using the adaptive navigation solution algorithm in application 520 to produce a first blended solution for control law 224. This provides the attitude control element for vehicle operation during a second deployment of the space station. The first configuration of the blended solution is incorporated in a first modular segment 622, which is launched in a spacecraft (block 632) into space. The modular segment 622 is joined with space station module 620, resulting in the second deployment of the space station (block 634).

In the second deployment, the GNC software control is reconfigured from the initial configuration to the first configuration of the blended solution by conventional techniques, such as virtual backplane fusing (block 638) as disclosed in U.S. Pat. No. 7,421,526. The process 600 then validates that the reconfiguration happened (block 640), such as through the validation technique disclosed in U.S. Pat. No. 8,175,759.

In the next stage of process 600, a second configuration of a blended solution for GNC software control is produced (block 642), such as by using the adaptive navigation solution algorithm in application 520 to produce a second blended solution for control law 224. This provides the attitude control element for vehicle operation during a third deployment of the space station. The second configuration of the blended solution is incorporated in a second modular segment 624, which is launched in a spacecraft (block 644) into space. The modular segment 624 is joined with space station module 620, already coupled with modular segment 622, resulting in the third deployment of the space station (block 646).

In the third deployment, the GNC software control is reconfigured from the first configuration of the blended solution to the second configuration of the blended solution by conventional techniques, such as virtual backplane fusing (block 638) as disclosed in U.S. Pat. No. 7,421,526. The process 600 then validates that the reconfiguration happened (block 640), such as through the validation technique disclosed in U.S. Pat. No. 8,175,759.

It should be understood that additional modular segments can be added to the space station in further deployments using the process of FIG. 6.

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact disks, DVDs, Blu-ray discs, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes a method of deploying a modular space station, the method comprising: placing an initial space station module in space in a first deployment, the initial space station module including a first control law and momentum component that provides an initial solution for guidance, navigation, and control of the initial space station module during the first deployment; joining a first space station modular segment with the initial space station module in a second deployment to produce a first joint configuration of the modular space station, wherein a second control law and momentum component provides a second solution for guidance, navigation, and control of the first joint configuration of the modular space station during the second deployment; and joining a second space station modular segment to the first joint configuration of the modular space station in a third deployment to produce a second joint configuration of the modular space station, wherein a third control law and momentum component provides a third solution for guidance, navigation, and control of the second joint configuration of the modular space station during the third deployment.

Example 2 includes the method of Example 1, wherein the initial space station module has an attitude control system that includes the first control law and momentum component.

Example 3 includes the method of Example 2, wherein the attitude control system comprises an attitude control electronics section comprising: at least one flight computer processor configured to execute instructions for operation of the control laws in providing guidance, navigation, and control for the space station; a first momentum exchange section in operative communication with the attitude control electronics section, the first momentum exchange section comprising a first array of momentum control devices that include momentum storage for the initial space station module; and one or more attitude sensors in operative communication with the attitude control electronics section.

Example 4 includes the method of Example 3, wherein the first array of momentum control devices includes a plurality of control moment gyroscopes or reaction wheels.

Example 5 includes the method of any of Examples 3-4, wherein the first space station modular segment includes a second momentum exchange section comprising a second array of momentum control devices that include momentum storage for the first space station modular segment.

Example 6 includes the method of Example 5, wherein the second space station modular segment includes a third momentum exchange section comprising a third array of momentum control devices that include momentum storage for the second space station modular segment.

Example 7 includes the method of any of Examples 1-6, wherein each of the control laws is implemented by one or more software applications in operative communication with an avionics operating system.

Example 8 includes the method of Example 7, wherein the software applications comprise: a first application that provides the initial solution for guidance, navigation, and control of the initial space station module during the first deployment; a second application that provides the second solution for guidance, navigation, and control of the first joint configuration of the modular space station during the second deployment; and a third application that provides the third solution for guidance, navigation, and control of the second joint configuration of the modular space station during the third deployment.

Example 9 includes the method of Example 8, wherein during the first deployment, the first application is active, while the second and third applications are inactive.

Example 10 includes the method of Examples 8, wherein during the second deployment, the second application is active, while the first and third applications are inactive.

Example 11 includes the method of Example 8, wherein during the third deployment, the third application is active, while the first and second applications are inactive.

Example 12 includes the method of Example 7, wherein one of the software applications comprises an adaptive navigation solution algorithm.

Example 13 includes the method of Example 12, wherein the adaptive navigation solution algorithm is configured to: provide the initial solution for guidance, navigation, and control during the first deployment of the space station; provide the second solution as a first blended solution for guidance, navigation, and control during the second deployment of the space station; and provide the third solution as a second blended solution for guidance, navigation, and control during the third deployment of the space station.

Example 14 includes an attitude control system for a modular space station comprising an attitude control electronics section, comprising: at least one flight computer processor configured to execute instructions for operation of a control law in providing guidance, navigation, and control for the space station; a first momentum exchange section in operative communication with the attitude control electronics section, the first momentum exchange section comprising a first array of momentum control devices that include momentum storage for an initial space station module; and one or more attitude sensors in operative communication with the attitude control electronics section; wherein the control law is implemented by a plurality of software applications comprising: a first application that provides an initial solution for guidance, navigation, and control of a first deployment of the space station, in which the initial space station module is placed in space; a second application that provides a second solution for guidance, navigation, and control of a second deployment of the space station in which a first space station modular segment is joined to the initial space station module to produce a first configuration of the space station; and a third application that provides a third solution for guidance, navigation, and control of a third deployment of the space station in which a second space station modular segment is joined to the first configuration of the space station to produce a second configuration of the space station.

Example 15 includes the system of Example 14, wherein the first array of momentum control devices comprises a plurality of control moment gyroscopes, or a plurality of reaction wheels.

Example 16 includes the system of any of Examples 14-15, further comprising a second momentum exchange section in operative communication with the attitude control electronics section, the second momentum exchange section comprising a second array of momentum control devices that include momentum storage for the first space station modular segment.

Example 17 includes the system of Example 16, further comprising a third momentum exchange section in operative communication with the attitude control electronics section, the third momentum exchange section comprising a third array of momentum control devices that include momentum storage for the second space station modular segment.

Example 18 includes an attitude control system for a modular space station comprising an attitude control electronics section, comprising: at least one flight computer processor configured to execute instructions for operation of a control law in providing guidance, navigation, and control for the space station; a first momentum exchange section in operative communication with the attitude control electronics section, the first momentum exchange section comprising a first array of momentum control devices that include momentum storage for an initial space station module; and one or more attitude sensors in operative communication with the attitude control electronics section; wherein the control law is implemented by a software application comprising an adaptive navigation solution algorithm, wherein the adaptive navigation solution algorithm is configured to: provide an initial solution for guidance, navigation, and control of a first deployment of the space station, in which the initial space station module is placed in space; provide a first blended solution for guidance, navigation, and control during a second deployment of the space station, in which a first space station modular segment is joined to the initial space station module to produce a first configuration of the space station; and provide a second blended solution for guidance, navigation, and control during a third deployment of the space station, in which a second space station modular segment is joined to the first configuration of the space station.

Example 19 includes the system of Example 18, further comprising a second momentum exchange section in operative communication with the attitude control electronics section, the second momentum exchange section comprising a second array of momentum control devices that include momentum storage for the first space station modular segment.

Example 20 includes the system of Example 19, further comprising a third momentum exchange section in operative communication with the attitude control electronics section, the third momentum exchange section comprising a third array of momentum control devices that include momentum storage for the second space station modular segment.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. An attitude control system for a modular space station, comprising:
 a first momentum exchange section comprising an array of control moment gyroscopes or reaction wheels;
 an attitude control electronics section in operative communication with the first momentum exchange section, the attitude control electronics section comprising at least one flight computer processor configured with a partitioned operating system that adheres to a protocol that provides a real time operating system interface for partitioning of avionics computer resources in time and space domains, wherein the at least one flight computer processor is configured to execute instructions for operation of a control law in providing an operative connection to the first momentum exchange section; and one or more attitude sensors in operative communication with the attitude control electronics section;

wherein the control law is implemented by a plurality of software applications comprising:

a first application that provides an initial solution for guidance, navigation, and control of a first deployment of the space station, in which the first space station module is placed in space;

a second application that provides a second solution for guidance, navigation, and control of a second deployment of the space station in which a second space station module is joined to the first space station module to produce a first configuration of the space station; and a third application that provides a third solution for guidance, navigation, and control of a third deployment of the space station in which a third space station module is joined to the first configuration of the space station to produce a second configuration of the space station;

wherein the first momentum exchange section includes momentum for a portion of the first configuration of the space station.

2. The system of claim 1, further comprising:

a second momentum exchange section in operative communication with the attitude control electronics section, the second momentum exchange section comprising an array of control moment gyroscopes or reaction wheels that include momentum storage for the second space station module.

3. The system of claim 2, further comprising:

a third momentum exchange section in operative communication with the attitude control electronics section, the third momentum exchange section comprising an array of control moment gyroscopes or reaction wheels that include momentum storage for the third space station module.

4. An attitude control system for a modular space station, comprising:

a first momentum exchange section comprising an array of control moment gyroscopes or reaction wheels, an attitude control electronics section in operative communication with the first momentum exchange section, the attitude control electronics section comprising at least one flight computer processor configured with a partitioned operating system that adheres to a protocol that provides a real time operating system interface for partitioning of avionics computer resources in time and space domains, wherein the at least one flight computer processor is configured to execute instructions for operation of a control law in providing an operative connection to the first momentum exchange section; and one or more attitude sensors in operative communication with the attitude control electronics section;

wherein the control law is implemented by a software application comprising an adaptive navigation solution algorithm, wherein the adaptive navigation solution algorithm is configured to:

provide an initial solution for guidance, navigation, and control of a first deployment of the space station, in which the first space station module is placed in space;

provide a first blended solution for guidance, navigation, and control during a second deployment of the space station, in which a second space station module is joined to the first space station module to produce a first configuration of the space station; and provide a second blended solution for guidance, navigation, and control during a third deployment of the space station, in which a second space station module is joined to the first configuration of the space station;

wherein the first momentum exchange section includes momentum for a portion of the first configuration of the space station.

5. The system of claim 4, further comprising:

a second momentum exchange section in operative communication with the attitude control electronics section, the second momentum exchange section comprising an array of control moment gyroscopes or reaction wheels that include momentum storage for the second space station module.

6. The system of claim 5, further comprising:

a third momentum exchange section in operative communication with the attitude control electronics section, the third momentum exchange section comprising an array of control moment gyroscopes or reaction wheels that include momentum storage for the third space station module.

7. A method of deploying a modular space station, the method comprising:

placing a first space station module in space in a first deployment, the first space station module comprising:

a first momentum exchange section comprising a first array of control moment gyroscopes or reaction wheels that include momentum storage for the first space station module;

a first attitude control electronics section in operative communication with the first momentum exchange section, the first attitude control electronics section comprising at least one first flight computer processor configured with a partitioned operating system that adheres to a protocol that provides a real time operating system interface for partitioning of avionics computer resources in time and space domains, wherein the at least one first flight computer processor is configured to execute instructions for operation of a first control law in providing an operative connection to the first momentum exchange section; and one or more attitude sensors coupled to the first space station module and in operative communication with the first attitude control electronics section:

placing a second space station module in space in a second deployment, the second space station module comprising:

a second momentum exchange section comprising a second array of control moment gyroscopes or reaction wheels that include momentum storage for the second space station module;

a second attitude control electronics section in operative communication with the second momentum exchange section, the second attitude control electronics section comprising at least one second flight computer processor configured with a partitioned operating system that adheres to the protocol defined in ARINC-653, wherein the at least one second flight computer processor is configured to execute instructions for operation of a second control law in providing an operative connection to the first and second momentum exchange sections; and one or more attitude sensors coupled to the second space station module and in operative communication with the second attitude control electronics section; and joining the second space station module with the first space station module to produce a first joint configuration of the modular space station.

8. The method of claim 7, wherein the partitioned operating system in each of the first and second attitude control electronics sections includes a safety partition that enforces safe operations during momentum changes as the second space station module is joined with the first space station module.

9. The method of claim 7, further comprising a third control law residing in a partition on the partitioned operating system in the second attitude control electronics section, the third control law capable of being active at the same time as the first control law through operative communication between the first flight computer processer and the second flight computer processor to control the first joint configuration.

10. The method of claim 7, wherein each of the control laws is implemented by one or more software applications in operative communication with the partitioned operating system in each of the first and second attitude control electronics sections.

11. The method of claim 10, wherein one of the software applications comprises an adaptive navigation solution algorithm.

\* \* \* \* \*